(12) United States Patent
Smith

(10) Patent No.: US 7,805,376 B2
(45) Date of Patent: Sep. 28, 2010

(54) METHODS AND APPARATUS FOR FACILITATING A TRANSACTION

(75) Inventor: Michael S. Smith, Sandy, UT (US)

(73) Assignee: American Express Travel Related Services Company, Inc., New York, NY (US)

( * ) Notice: Subject to any disclaimer, the term of this patent is extended or adjusted under 35 U.S.C. 154(b) by 1516 days.

(21) Appl. No.: 10/391,689

(22) Filed: Mar. 19, 2003

(65) Prior Publication Data

US 2003/0233334 A1    Dec. 18, 2003

Related U.S. Application Data

(63) Continuation-in-part of application No. 10/064,151, filed on Jun. 14, 2002, now Pat. No. 6,901,387.

(51) Int. Cl.
*G06Q 20/00* (2006.01)
(52) U.S. Cl. .............................. 705/64; 705/65; 705/66; 235/379; 713/159; 902/25; 902/26; 902/27; 902/28; 902/29
(58) Field of Classification Search .................. 705/64, 705/65, 66; 235/379; 713/159; 902/25–29
See application file for complete search history.

(56) References Cited

U.S. PATENT DOCUMENTS

| | | | |
|---|---|---|---|
| 3,719,927 A | 3/1973 | Michels et al. |
| 4,491,725 A | 1/1985 | Pritchard |
| 4,594,663 A | 6/1986 | Nagata et al. |
| 4,734,564 A | 3/1988 | Boston et al. |
| 4,812,628 A | 3/1989 | Boston et al. |
| 4,891,503 A | 1/1990 | Jewell |
| 4,916,611 A | 4/1990 | Doyle, Jr. et al. |
| 5,036,461 A | 7/1991 | Elliott et al. |
| 5,070,452 A | 12/1991 | Doyle, Jr. et al. |
| 5,210,687 A | 5/1993 | Wolfberg et al. |
| 5,301,105 A | 4/1994 | Cummings, Jr. |
| 5,621,201 A | 4/1997 | Langhans et al. |
| 5,631,828 A | 5/1997 | Hagan |
| 5,649,116 A | 7/1997 | McCoy et al. |
| 5,708,422 A | 1/1998 | Blonder et al. |

(Continued)

FOREIGN PATENT DOCUMENTS

EP          0072183          2/1983

(Continued)

OTHER PUBLICATIONS

Phillips, Stephen: Financial Times (FT.COM) Case Study—Orbiscom and Cyota. Sep. 5, 2001. http://www.cyota.com/viewCyotaNews.cfm?id=41. Retrieved from IDS Jun. 21, 2010.*

(Continued)

*Primary Examiner*—James A Reagan
(74) *Attorney, Agent, or Firm*—Snell & Wilmer L.L.P.

(57) ABSTRACT

A system, method, apparatus, means, and computer program code for conducting a transaction include identifying information defining a transaction including at least a transaction amount, identifying an account identifier to associate with the transaction, and establishing a pre-authorization record associated with the account identifier, the pre-authorization record including an authorization restriction based on the transaction amount.

25 Claims, 6 Drawing Sheets

U.S. PATENT DOCUMENTS

| | | | |
|---|---|---|---|
| 5,710,887 | A | 1/1998 | Chelliah et al. |
| 5,715,403 | A | 2/1998 | Stefik |
| 5,724,424 | A | 3/1998 | Gifford |
| 5,732,400 | A | 3/1998 | Mandler et al. |
| 5,748,908 | A | 5/1998 | Yu |
| 5,757,917 | A | 5/1998 | Rose et al. |
| 5,758,327 | A | 5/1998 | Gardner et al. |
| 5,781,632 | A | 7/1998 | Odom |
| 5,790,677 | A | 8/1998 | Fox et al. |
| 5,797,133 | A | 8/1998 | Jones et al. |
| 5,798,508 | A | 8/1998 | Walker et al. |
| 5,822,737 | A | 10/1998 | Ogram |
| 5,825,881 | A | 10/1998 | Colvin, Sr. |
| 5,826,241 | A | 10/1998 | Stein et al. |
| 5,826,245 | A | 10/1998 | Sandberg-Diment |
| 5,832,447 | A | 11/1998 | Rieker et al. |
| 5,850,446 | A | 12/1998 | Berger et al. |
| 5,864,829 | A | 1/1999 | Tago |
| 5,883,810 | A | 3/1999 | Franklin et al. |
| 5,890,137 | A | 3/1999 | Koreeda |
| 5,914,472 | A | 6/1999 | Foladare et al. |
| 5,945,653 | A * | 8/1999 | Walker et al. ............... 235/380 |
| 5,953,710 | A * | 9/1999 | Fleming ...................... 705/38 |
| 5,956,700 | A | 9/1999 | Landry |
| 5,991,750 | A | 11/1999 | Watson |
| 6,000,832 | A | 12/1999 | Franklin et al. |
| 6,006,205 | A | 12/1999 | Loeb et al. |
| 6,014,650 | A * | 1/2000 | Zampese ..................... 705/44 |
| 6,029,890 | A | 2/2000 | Austin |
| 6,052,675 | A | 4/2000 | Checchio |
| 6,128,603 | A | 10/2000 | Dent et al. |
| 6,163,771 | A | 12/2000 | Walker et al. |
| 6,169,974 | B1 | 1/2001 | Baumgartner et al. |
| 6,193,155 | B1 | 2/2001 | Walker et al. |
| 6,226,624 | B1 * | 5/2001 | Watson et al. ................. 705/44 |
| 6,227,447 | B1 | 5/2001 | Campisano |
| 6,324,526 | B1 | 11/2001 | D'Agostino |
| 6,327,578 | B1 | 12/2001 | Linehan |
| 6,330,544 | B1 | 12/2001 | Walker et al. |
| 6,339,766 | B1 | 1/2002 | Gephart |
| 6,360,209 | B1 | 3/2002 | Loeb et al. |
| 6,453,296 | B1 | 9/2002 | Iwamura |
| 6,456,984 | B1 | 9/2002 | Demoff et al. |
| 6,493,685 | B1 | 12/2002 | Ensel et al. |
| 6,598,031 | B1 | 7/2003 | Ice |
| 6,636,833 | B1 * | 10/2003 | Flitcroft et al. ................. 705/1 |
| 6,748,367 | B1 * | 6/2004 | Lee ............................. 705/66 |
| 6,901,387 | B2 | 5/2005 | Wells et al. |
| 6,955,294 | B1 | 10/2005 | Seegar |
| 7,006,994 | B1 | 2/2006 | Campbell et al. |
| 7,117,172 | B1 | 10/2006 | Black |
| 7,413,112 | B2 | 8/2008 | Nelson |
| 2001/0007098 | A1 | 7/2001 | Hinrichs et al. |
| 2001/0011222 | A1 | 8/2001 | McLauchlin et al. |
| 2001/0029473 | A1 | 10/2001 | Yamaoka et al. |
| 2001/0032192 | A1 | 10/2001 | Putta et al. |
| 2001/0034702 | A1 | 10/2001 | Mockett et al. |
| 2001/0034720 | A1 | 10/2001 | Armes |
| 2001/0037312 | A1 | 11/2001 | Gray et al. |
| 2001/0042784 | A1 | 11/2001 | Fite et al. |
| 2001/0047310 | A1 | 11/2001 | Russell |
| 2001/0047330 | A1 | 11/2001 | Gephart et al. |
| 2001/0047335 | A1 | 11/2001 | Arndt et al. |
| 2001/0047336 | A1 | 11/2001 | Maycock, Jr. et al. |
| 2001/0051917 | A1 | 12/2001 | Bissonette et al. |
| 2001/0051924 | A1 | 12/2001 | Uberti |
| 2002/0007320 | A1 | 1/2002 | Hogan et al. |
| 2002/0035548 | A1 | 3/2002 | Hogan et al. |
| 2002/0059146 | A1 | 5/2002 | Keech |
| 2002/0065774 | A1 | 5/2002 | Young et al. |
| 2002/0073045 | A1 | 6/2002 | Rubin et al. |
| 2002/0077977 | A1 | 6/2002 | Neely et al. |
| 2002/0091646 | A1 | 7/2002 | Lake et al. |
| 2002/0116327 | A1 | 8/2002 | Srinivasan |
| 2002/0120587 | A1 | 8/2002 | D'Agostino |
| 2002/0133467 | A1 | 9/2002 | Hobson et al. |
| 2002/0161701 | A1 | 10/2002 | Warmack |
| 2002/0174030 | A1 | 11/2002 | Praisner et al. |
| 2003/0018567 | A1 | 1/2003 | Flitcroft et al. |
| 2003/0028481 | A1 | 2/2003 | Flitcroft et al. |
| 2003/0101145 | A1 | 5/2003 | Fang et al. |
| 2003/0110136 | A1 * | 6/2003 | Wells et al. ................... 705/64 |
| 2003/0125969 | A1 | 7/2003 | Kizer et al. |
| 2004/0078328 | A1 | 4/2004 | Talbert et al. |
| 2004/0107125 | A1 | 6/2004 | Guheen et al. |
| 2004/0148254 | A1 | 7/2004 | Hauser |
| 2004/0210531 | A1 | 10/2004 | Barron et al. |
| 2004/0230536 | A1 | 11/2004 | Fung et al. |
| 2005/0119942 | A1 | 6/2005 | Horrocks et al. |
| 2005/0240522 | A1 | 10/2005 | Kranzley et al. |
| 2006/0206425 | A1 | 9/2006 | Sharma |
| 2007/0005498 | A1 | 1/2007 | Cataline et al. |
| 2007/0040020 | A1 | 2/2007 | Anderson et al. |

FOREIGN PATENT DOCUMENTS

| | | |
|---|---|---|
| EP | 0745961 | 12/1996 |
| EP | 1 029 311 B1 | 6/2001 |
| EP | 1 115 095 A2 | 7/2001 |
| JP | 10143556 | 5/1998 |
| JP | 10143556 A * | 5/1998 |
| WO | WO9930294 | 6/1999 |
| WO | WO 99/49424 A1 | 9/1999 |
| WO | WO 00/49586 | 8/2000 |
| WO | WO 00/62259 A1 | 10/2000 |
| WO | WO 01/29637 A2 | 4/2001 |
| WO | WO03069531 | 8/2003 |

OTHER PUBLICATIONS

Phillips, Stephen: "Case Study—Orbiscom and Cyota", Sep. 5, 2001, download from http://www.cyota.com/viewCyotaNews.cfm?id=41 on Apr. 24, 2002, © 2001, The Financial Times. 2pgs.

Phillips, Stephen-—"Case Study—Orbiscom and Cyota", Sep. 5, 2001, download from http://specials.ft.com/ftit/ sept2001/ FT3D4S186RC.html on Mar. 26, 2009, © 2001, The Financial Times.

Notice of Allowance; U.S. Appl. No. 08/957,419; Jun. 29, 1999.
Notice of Allowance; U.S. Appl. No. 09/276,289; Jan. 12, 2000.
Notice of Allowance; U.S. Appl. No. 09/276,289; Feb. 22, 2001.
Notice of Allowance; U.S. Appl. No. 10/064,151; Nov. 26, 2004.
Notice of Allowance; U.S. Appl. No. 11/005,593; Oct. 3, 2006.
Notice of Allowance; U.S. Appl. No. 10/801,765; Jun. 25, 2008.
Office Action in U.S. Appl. No. 11/005,593 dated Sep. 13, 2005.
Office Action in U.S. Appl. No. 11/005,593 dated Feb. 24, 2006.
Office Action in U.S. Appl. No. 11/005,593 dated Jul. 24, 2006.
Office Action in U.S. Appl. No. 11/653,108 dated Nov. 1, 2007.
Office Action in U.S. Appl. No. 11/653,108 dated Jan. 13, 2009.
Notice of Allowance in U.S. Appl. No. 11/653,108 dated May 7, 2009.
Office Action in U.S. Appl. No. 10/724,940 dated Jul. 29, 2008.
Final Office Action in U.S. Appl. No. 10/724,940 dated Dec. 1, 2008.
Advisory Action in U.S. Appl. No. 10/724,940 dated Feb. 24, 2009.
Notice of Allowance in U.S. Appl. No. 10/724,940 dated Apr. 22, 2009.
Office Action in U.S. Appl. No. 10/391,689 dated Oct. 23, 2007.
Final Office Action in U.S. Appl. No. 10/391,689 dated Jun. 12, 2008.
Office Action in U.S. Appl. No. 10/391,689 dated Dec. 1, 2008.
Office Action in U.S. Appl. No. 10/391,689 dated Jun. 11, 2009.
Office Action in U.S. Appl. No. 10/801,765 dated Nov. 30, 2005.
Office Action in U.S. Appl. No. 10/801,765 dated May 19, 2006.
Office Action in U.S. Appl. No. 10/801,765 dated Dec. 22, 2006.
Office Action in U.S. Appl. No. 10/801,765 dated Apr. 11, 2007.
Office Action in U.S. Appl. No. 10/801,765 dated Oct. 30, 2007.

Final Office Action in U.S. Appl. No. 10/801,765 dated Mar. 17, 2008.
Notice of Allowance in U.S. Appl. No. 10/801,765 dated Jun. 25, 2008.
Office Action in U.S. Appl. No. 12/194,493 dated Jul. 24, 2009.
Office Action in U.S. Appl. No. 11/643,722 dated Apr. 7, 2008.
Final Office Action in U.S. Appl. No. 11/643,722 dated Oct. 31, 2008.
Advisory Action in U.S. Appl. No. 11/643,722 dated Jan. 28, 2009.
Office Action in U.S. Appl. No. 11/643,722 dated Mar. 12, 2009.
Notice of Allowance in U.S. Appl. No. 11/643,722 dated Aug. 10, 2009.
The International Search Report and The Written Opinion of the International Searching Authority mailed Jan. 29, 2010 for PCT/US2009/066311.
Final Rejection mailed Jan. 27, 2010 in U.S. Appl. No. 10/391,689.
The International Search Report and The Written Opinion of the International Searching Authority mailed Jan. 29, 2010 for International Application No. PCT/US2009/066311.

* cited by examiner

US 7,805,376 B2

METHODS AND APPARATUS FOR FACILITATING A TRANSACTION

CROSS-REFERENCE TO RELATED APPLICATION

This application is a continuation-in-part application of, and claims priority to, U.S. application Ser. No. 10/064,151, filed Jun. 14, 2002 now U.S. Pat. No. 6,901,387, and entitled "ELECTRONIC PURCHASING METHOD AND APPARATUS FOR PERFORMING THE SAME", the entire contents of which are incorporated herein by reference for all purposes.

FIELD

The present invention relates to a method and apparatus for facilitating a transaction and, more particularly, embodiments of the present invention relate to methods, means, apparatus, and computer program code for facilitating a purchase transaction.

BACKGROUND

There are many ways in which a buyer can purchase goods or services from merchants. In some types of transactions, buyers use an intermediary of some sort to facilitate the purchase of goods or services from merchants. For example, the development of the Internet has led to the wide-spread use of transaction intermediaries which allow a buyer to purchase goods or services from a number of different merchants. Often, the buyer is required to pay for the goods or services by providing the intermediary with a payment account identifier which is then passed on to each of the merchants for payment. In some systems, the buyer pays the intermediary and then the intermediary is billed by each of the merchants so that the merchants are eventually paid for their goods or services. These types of systems can be inefficient and also can be subject to fraud (particularly where the buyer's payment information is forwarded on to each of the merchants). It would be desirable to provide an improved method and apparatus which provides an efficient, reliable, and fraud-resistant approach to paying merchants in these types of transactions. Generally, it would be advantageous to provide a method and apparatus that overcame drawbacks of previous transaction systems.

SUMMARY

Embodiments of the present invention provide a system, method, apparatus, means, and computer program code for conducting a transaction include identifying information defining a transaction including at least a transaction amount, identifying an account identifier to associate with the transaction, and establishing a pre-authorization record associated with the account identifier, the pre-authorization record including an authorization restriction based on the transaction amount.

In some embodiments, a system, apparatus, method, means and computer program code for conducting a transaction are provided which include: receiving a transaction request from a buyer, the transaction request including a request to purchase a first product from a first merchant for a first price and a second product from a second merchant for a second price; identifying a first limited use account identifier including use restrictions associated with at least one of the first price, the first product and the first merchant; identifying a second limited use account identifier including use restrictions associated with at least one of the second price, the second product and the second merchant; establishing a transaction record confirming the transaction; and providing the first limited use account identifier to the first merchant and the second limited use account identifier to the second merchant for payment for the first and second products. In some embodiments, the account identifiers are retrieved from at least one of a primary card pool and a backup card pool.

According to some embodiments, a system, method, apparatus, means and computer program code for limiting a transaction are provided which include: identifying an account; identifying a transaction involving the account, the transaction having a start date; establishing a pre-authorization record associated with the account, the pre-authorization record identifying the start date; receiving an authorization request associated with the account and a transaction, the transaction having a date; and authorizing the transaction if the date is on or after the start date.

According to some embodiments, a system, method, apparatus, means and computer program code for managing a backup card pool are provided which include: identifying a primary card pool containing a plurality of account identifiers; selecting a subset of the account identifiers and indicating that the subset of account identifiers are not available for use in the primary card pool; establishing initial pre-authorization criteria associated with the subset of account identifiers; and creating the backup card pool containing the subset of account identifiers.

With these and other advantages and features of embodiments that will become hereinafter apparent, the nature of embodiments may be more clearly understood by reference to the following detailed description, the appended claims and to the several drawings attached herein.

DETAILED DESCRIPTION

Applicants have recognized that there is a need to provide systems, means, computer code, and methods that facilitate coordination of a transaction by a party acting as an intermediary or facilitator between a buyer desiring to obtain a product or service, and one or more merchants that may be able to supply the product or service, and an account issuer.

For the purposes of explaining features of embodiments, a number of terms are used herein. For example, the term "buyer" is used herein to refer to a buyer of goods or services, and may refer to an individual or entity. As used herein, the term "credit card" is used to refer to payment cards, including bank credit cards, debit cards, private label cards, or other payment instruments which may be used to conduct purchase transactions between a buyer and a merchant.

As used herein, the terms "transaction intermediary" or "transaction facilitator" are used to refer to an entity which operates as a intermediary between purchasers and sellers of products or services. Throughout this disclosure, several examples of types of "transaction intermediaries" or "facilitators" will be provided (e.g., including entities operating as travel agents or brokers of travel-related services, fleet service providers, purchasing consortium, etc.). Those skilled in the art will appreciate that features of embodiments may be used in conjunction with any of a number of different intermediaries and is not limited to use by the specific types of intermediaries used in the examples.

As used herein, the term "issuer" or "account issuer" is used to refer to financial institutions (or their agents) which issue credit cards or other payment cards. In some embodiments, several issuers may be involved in a transaction. The term "issuer" or "account issuer" may also refer to issuer processors or other agents which perform processing on behalf of financial institutions which issue payment cards.

As used herein, the term "product" is generically used to refer to goods, services or other items which are sold to buyers from merchants.

System

Figure 1:
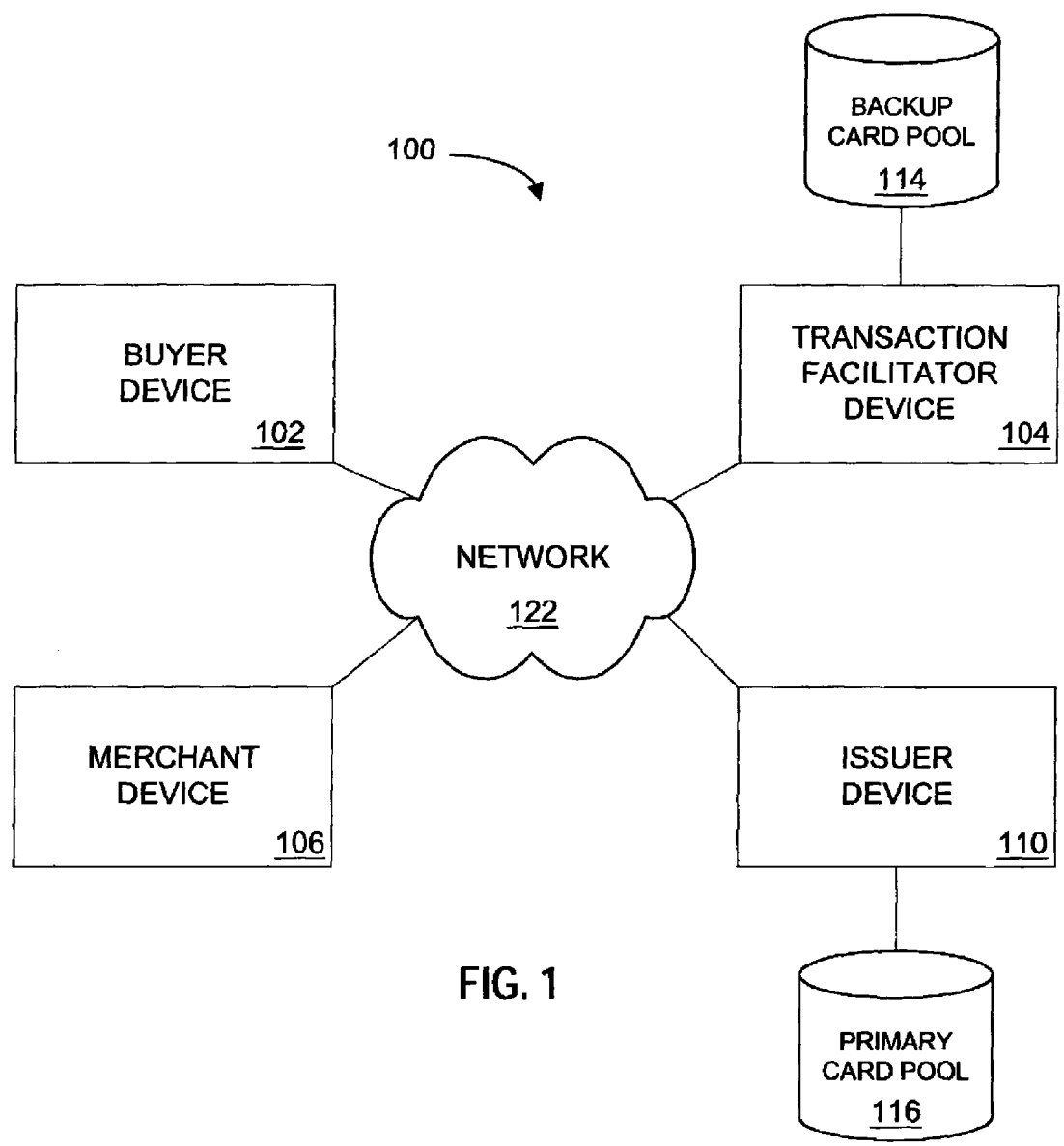
FIG. 1 is a block diagram depicting system of embodiments of the present invention.

Reference is first made to FIG. 1, where a system 100 is shown which is configured to operate using features of some embodiments of the present invention. As depicted, system 100 includes a buyer device 102 in communication with a communication network 122 and other devices including a transaction facilitator device 104, a merchant device 106 and an issuer device 110. Upon reading this disclosure, those skilled in the art will appreciate that a number of each of the devices may be provided and that, for the sake of simplicity, only individual ones of the devices are shown (e.g., one or more different buyer devices may interact with one or more transaction facilitator devices, merchant devices and issuer devices to conduct transactions using features of embodiments of the present invention). Some or all of the devices may include computing devices or other devices such as a personal computer, portable computer, mobile or fixed buyer station, workstation, network terminal or server, cellular telephone, wired telephone, kiosk, dumb terminal, point of sale terminal, personal digital or data assistant, etc.

Buyer device 102 may be a device such as a computer, telephone, or other device operated by or on behalf of a buyer desiring to purchase goods or services from a merchant 106. As described herein, buyer device 102 is configured to interact with a transaction facilitator device 104 to purchase goods or services from merchant 106. Each of the devices may be in communication over network 122 which might be or include the Internet, the World Wide Web, or some other public or private computer, cable, telephone, client/server, peer-to-peer, or other communications network such as public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc. Moreover, as used herein, communications include those enabled by wired or wireless technology. The devices shown in FIG. 1 need not be in constant communication. For example, the buyer device 102 may communicate with the facilitator device 104 only when such communication is appropriate or necessary.

Transaction facilitator device 104 is operated by or on behalf of an entity which functions to facilitate transactions between buyers and merchants. Any of a number of different transaction facilitators may utilize features of embodiments of the present invention. For example, a transaction facilitator may be an entity such as a travel agency which facilitates the sale of travel-related products or services to buyers. As another example, a transaction facilitator may be an Internet company which acts as a catalog or agent to sell products or services from a variety of merchants to buyers. As yet another example, a transaction facilitator may be an entity such as a fleet manager which manages a fleet of leased vehicles and which facilitates transactions between vehicle operators ("buyers") and service providers ("merchants"). Other examples of entities which may operate as transaction facilitators using features of embodiments of the present invention will become apparent to those skilled in the art upon reading this disclosure.

In some embodiments, transaction facilitator device 104 may be a computing device which is adapted to communicate with other devices such as buyer device 102 over a communications network 122. For example, transaction facilitator device 104 may be configured as a server which interacts with other devices via communication over the Internet or other networks.

One or more issuer devices 110 are operated by (or on behalf of) financial account issuers which have an account relationship with transaction facilitators. For example, each transaction facilitator participating in transactions pursuant to embodiments of the present invention has an account or other relationship with an issuer of financial accounts such as a financial institution. The issuer, pursuant to some embodiments, issues a plurality of limited use accounts (each identified by a limited use account identifier) on behalf of the transaction facilitator. For example, in some embodiments, the limited use accounts are credit or debit accounts and the limited use account identifiers are formatted as credit or debit account identifiers which may be routed and processed using existing credit and debit card networks. The issuer devices 110 may act to authorize or deny transactions presented using accounts associated with each issuer.

For example, an issuer operating an issuer device 110 may issue a number of limited use account numbers associated with a particular transaction facilitator. The transaction facilitator may cause one of the limited use account identifiers to be used in a transaction (e.g., by providing the account identifier to a merchant for payment as will be described further below). The merchant may then present the limited use account identifier along with other transaction details (such as a payment amount, etc.) to the issuer for authorization and payment. This presentation for authorization and payment may be performed using existing payment networks such as, for example, using the VisaNet network operated by Visa International Service Association®, the MasterCard RPS network operated by MasterCard, Inc.®, or the like.

In some embodiments, each limited use account identifier is selectively associated with a particular transaction to allow payment of a merchant for the transaction. Pursuant to some embodiments, the account numbers are "limited use" account identifiers because each account identifier that is retrieved from the pool is associated with a pre-authorization record that limits the circumstances in which the account identifier may be used (that is, an authorization request presented by a merchant will be declined if the terms of the pre-authorization record are not satisfied). As will be described further below, the pre-authorization record may be generated based on the details of a specific transaction with which a particular limited use account identifier is associated. The pre-authorization record may specify, for example, a particular price, a particular merchant, a particular purchase date, and other transaction details that must be satisfied before a transaction using the limited use account identifier will be authorized.

Further details of pre-authorization techniques which may be utilized to restrict the use of the account identifiers are set forth in U.S. Pat. Nos. 5,991,750 and 6,226,624, for "System and method for pre-authorization of individual account transactions" and "System and method for pre-authorization of individual account remote transactions", the contents of each of which are incorporated by reference herein in their entirety. Further details of card pools, limited use account identifiers, pre-authorization, and other techniques are described in above-referenced U.S. patent application Ser. No. 10/064, 151.

In some embodiments, such as the embodiment depicted in FIG. 1, a pool of limited use account identifiers issued by an issuer on behalf of a particular transaction facilitator may be broken into two or more pools. As depicted in FIG. 1, a primary card pool 116 is stored at (or accessible to) the issuer device 10 (or an agent of the issuer or an agent of the transaction facilitator such as an issuer processor or a merchant processor). A backup or secondary card pool 114 is stored at (or accessible to) the transaction facilitator device 104. As will be described further below, the use of both a primary and a backup account pool may allow transaction facilitator device 104 to quickly respond to different transactions even if communication between the transaction facilitator device 104 and the issuer device 110 is slow or unavailable. Further details of transactions pursuant to some embodiments of the present invention will be discussed further below, however, a brief example follows immediately below to illustrate features of some embodiments of the present invention.

In one illustrative example, a buyer wishes to book travel plans using a travel facilitator. The buyer operates a computer (the "buyer device") and uses the computer to interact with a server operated on behalf of the travel facilitator (the "transaction facilitator device") via the Internet. The buyer selects a rental car and an airline ticket after interacting with the travel facilitator to search various travel options. As a specific example, assume the buyer selects an rental car from Hertz for 3 days starting on Mar. 15, 2003 and an airline ticket from United Airlines for travel dates of Mar. 15, 2003 and Mar. 17, 2003. The price of the airline ticket is $300 and the price of the car rental is $150. The buyer pays the travel facilitator the total amount of the purchase plus a transaction fee of $25 (for a total purchase price of $475). The buyer charges this amount to his credit card (which may be issued by a different issuer), and the travel facilitator is paid $475 using the credit card networks.

A transaction record is generated by the travel facilitator which includes information identifying the two merchants involved in the transaction (i.e., Hertz and United Airlines), the price of the goods purchased from each merchant (i.e., $150 and $300 respectively), and the dates of travel. The travel facilitator forwards a message to the issuer device requesting that limited use account identifiers be selected for each transaction. If the issuer device is available to respond, the issuer device identifies the appropriate card pool (i.e., the card pool which is associated with the travel facilitator) and retrieves a limited use account identifier for each merchant. A pre-authorization record is established for each limited use account identifier to impose one or more use restrictions on the selected limited use account identifiers. For example, one limited use account identifier may be associated with the rental car purchase, and a second limited use account identifier may be associated with the airline ticket purchase.

A pre-authorization record may be established for this limited use account identifier which restricts its use to use at Hertz during the period of March 15-17, 2003. The pre-authorization record may further impose a dollar limit on the transaction. Similar restrictions may be imposed on the limited use account identifier retrieved for use in paying for the airfare. The selected limited use account identifiers are then transmitted to the travel facilitator for use in completing the transaction with the merchants. Because use restrictions have been imposed on each of the limited use accounts (using the pre-authorization records associated with each), any attempted use of the limited use account identifiers which does not satisfy the use restrictions will be declined. Only a properly-presented authorization request using the account identifiers will be authorized. In this manner, for example, embodiments of the present invention ensure that fraudulent use of account identifiers is reduced. Further, transaction facilitators are now able to complete a large number of transactions with a large number of merchants in a controlled manner. Further benefits and advantages will become apparent to those skilled in the art based on the remaining disclosure.

Process Descriptions

Figure 2:
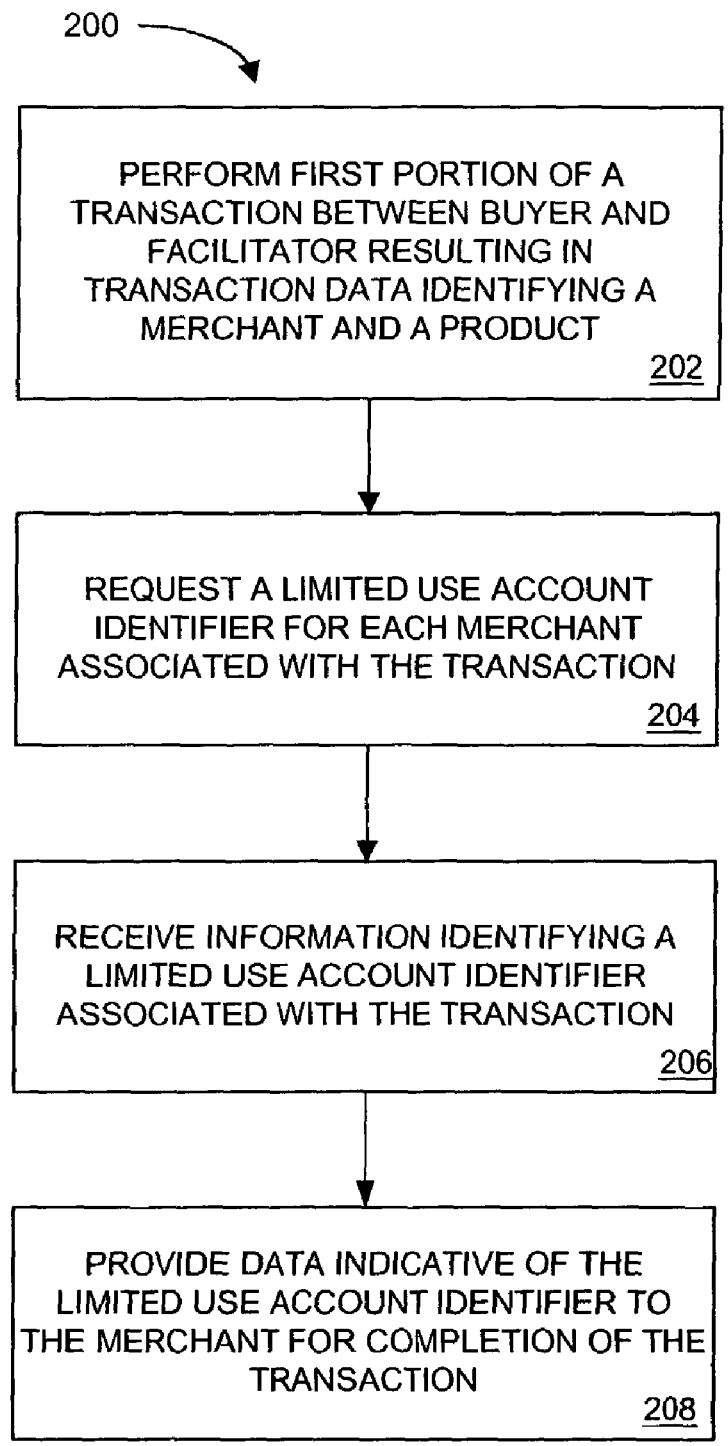
FIG. 2 is a flow diagram depicting a process according to some embodiments.

Reference is now made to FIG. 2, where a flow chart 200 is shown which represents the operation of an embodiment of the present invention. The particular arrangement of elements in the flow chart 200 (and the other flow charts described herein) is not meant to imply a fixed order to the steps; embodiments of the present invention can be practiced in any order that is practicable. For purposes of explanation, but not limitation, the facilitator device 104 is assumed to be implementing the method 200.

Processing begins at 202 where facilitator device 104, interacting with buyer device 102, performs a first portion of a transaction in which transaction data is generated identifying a merchant and a product desired by the buyer. Processing at 202 may include, in some transactions, the identification of multiple merchants and/or multiple products desired by the buyer. Processing at 202 may include any of a number of types of interaction between the buyer and the transaction facilitator. For example, processing at 202 may involve interaction over an Internet Web site operated by a transaction facilitator to sell products or services from a variety of merchants to buyers. As another example, processing at 202 may involve interaction between a buyer and a transaction facilitator using a telephone or the like. In some embodiments, processing at 202 may include processing in which the buyer provides payment to the transaction facilitator for a product (e.g., the buyer may provide the transaction facilitator with payment card information).

Once transaction data has been identified at 202, processing continues at 204 where the transaction facilitator requests a limited use account identifier. In some embodiments, the transaction facilitator requests a separate limited use account identifier for each merchant associated with the transaction (as will be described below, each merchant will be compensated for their goods or services with a payment using a limited use account identifier). In some embodiments, this may include transmitting a request for a limited use account identifier to a processor (e.g., such as the issuer device shown in FIG. 1) which is responsible for maintaining a card pool on behalf of the transaction facilitator. For example, this may include generating an electronic message (e.g., such as an XML-formatted message) and transmitting it along with transaction data to an issuer device. The issuer device (or other entity which maintains the card pool on behalf of the transaction facilitator) first identifies an appropriate card pool (e.g., the card pool associated with the transaction facilitator) and then selects an available limited use account identifier.

In some embodiments (which will be described further below), processing at 204 may include retrieving a limited use account identifier from a local card pool (or a "backup" card pool). For example, in some embodiments, a primary card pool may be stored at (or accessible to) an issuer device and a backup card pool may be stored at (or accessible to) transaction facilitator device. In this manner, if the issuer device is unable to promptly respond to a request for a limited use account identifier, the transaction facilitator device may retrieve one from the backup card pool.

Processing continues at 206 where the transaction facilitator device receives information identifying a limited use account identifier associated with the transaction. In some embodiments, where several merchants are associated with the transaction, several limited use account identifiers may be returned to the facilitator at 206. Each of the limited use account identifiers is associated with a pre-authorization record which was established based on the transaction information submitted at 204. For example, the pre-authorization record may specify use limitations such as, for example, the date of purchase, the amount of the purchase, the type of purchase (e.g., which may be limited using an industry code such as a SIC code), the merchant associated with the purchase (e.g., which may be specified using a merchant category code, a merchant identifier, or other merchant identifying information), or other limitations which may be specified using a payment card authorization network. Once a pre-authorization record is created, it is associated with the limited use account identifier and is used to control the approval or denial of any authorization requests which are received for the limited use account identifier (e.g., once a pre-authorization record is established for an account, all authorization requests received associated with that account will be compared to the pre-authorization record to measure whether a request should be approved or declined).

Processing continues at 208 where the transaction facilitator provides data indicative of the selected limited use account identifier (received at 206) to each merchant associated with the transaction. The merchant than uses the limited use account identifier to complete the transaction. In some embodiments, the merchant presents the limited use account identifier to the issuer for authorization using existing payment card networks and techniques (for example, the limited use account identifier may be presented using the MasterCard payment card network). If the merchant presents the limited use account identifier in a manner which complies with the use limitations established at 204, the transaction will be authorized and the merchant will receive payment for the product.

Figure 3:
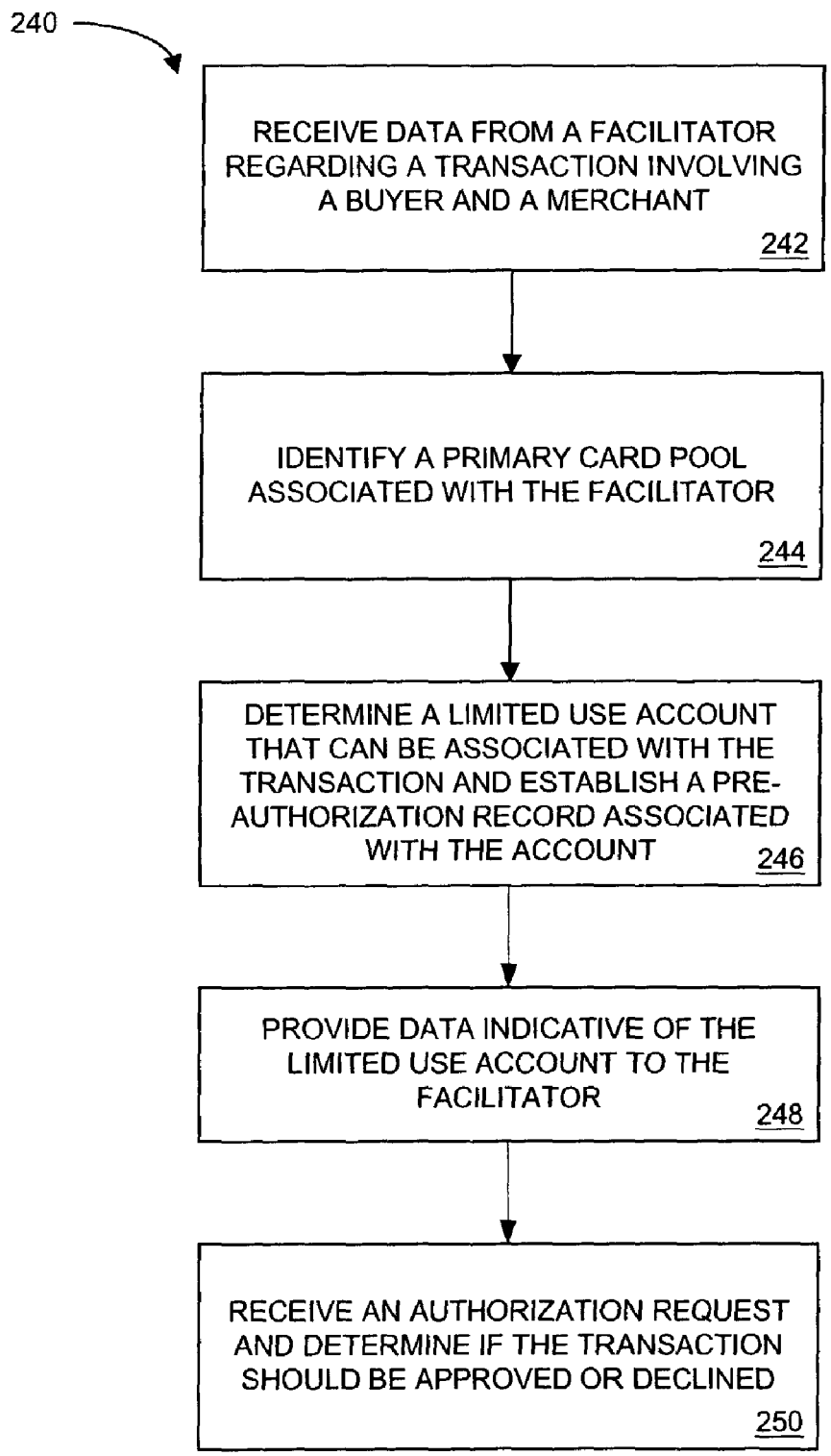
FIG. 3 is a flow diagram depicting a further process according to some embodiments.

Reference is now made to FIG. 3, where a further process 240 is shown. Process 240 includes steps of a transaction which may be performed by a device such as issuer device 110 of FIG. 1. Process 240 begins at 242 where the device receives data from a facilitator (e.g., such as from transaction facilitator device 104 of FIG. 1) regarding a transaction involving a buyer and a merchant. For example, the data received at 242 may include information identifying a product (or products), a merchant, a price, an estimated date of when the products will be purchased, etc. The data received at 242 may also include a transaction number and information identifying the buyer.

Processing continues at 244 where a primary card pool associated with the facilitator is identified. Processing at 244 may include, for example, validating the identity of the facilitator and identifying a primary card pool associated with the identified facilitator (e.g., the identity may be validated using digital certificates and/or other cryptographic techniques). Each issuer may maintain a number of different card pools on behalf of a number of different entities which act as transaction facilitators. Each card pool may be identified by a unique identifier associated with each facilitator to ensure that limited use account identifiers stored in each card pool are only provided to the appropriate facilitator.

Once the appropriate primary card pool is identified, processing continues at 246 where a limited use account identifier is selected from the card pool and associated with the transaction. For example, processing at 246 may include determining whether any limited use account identifiers are available in the pool. In some embodiments, each limited use account identifier may be associated with only one transaction. When the transaction is completed, the limited use account identifier may be recycled in the pool. Until the transaction is completed, however, the limited use account identifier will not be available for further use. Accordingly, limited use account identifiers which are currently associated with pending transactions will be flagged as "unavailable". If all the limited use account identifiers in the pool are flagged as "unavailable", processing at 246 may fail. If a limited use account identifier is available, processing at 246 further includes establishing a pre-authorization record associated with the selected identifier. This pre-authorization record (as described above in conjunction with FIG. 2) may include one or more use restrictions associated with the limited use account identifier which will cause a later authorization request associated with the identifier to be approved or declined.

Once a limited use account identifier is selected and a pre-authorization record has been established, processing continues at 248 where data indicative of the limited use account identifier is provided to the transaction facilitator. For example, the data may be transmitted to the transaction facilitator over the Internet, or using other communications networks. In some embodiments, processing at 248 is substantially automated (e.g., the data is generally transmitted without need for manual intervention). The transaction facilitator may then provide the account identifier to the merchant to complete the transaction.

Processing continues at 250 where the issuer (or an agent of the issuer) receives an authorization request associated with the limited use account identifier. The authorization request, in some embodiments, is presented to the issuer via the bankcard networks and includes information identifying the account and details regarding the proposed transaction (e.g., such as a date, time, amount, merchant, etc.). The transaction details are compared to the pre-authorization record which was previously established for the limited use account identifier (e.g., at step 246 above) to determine if the transaction should be authorized or declined. For example, if the pre-authorization record established for a particular limited use account identifier included a use limitation that the account can only be authorized for a purchase of $500 between Mar. 15 and Mar. 30, 2003, and if the authorization request received at 250 is for a transaction dated April 15, the transaction may be declined.

Figure 4:
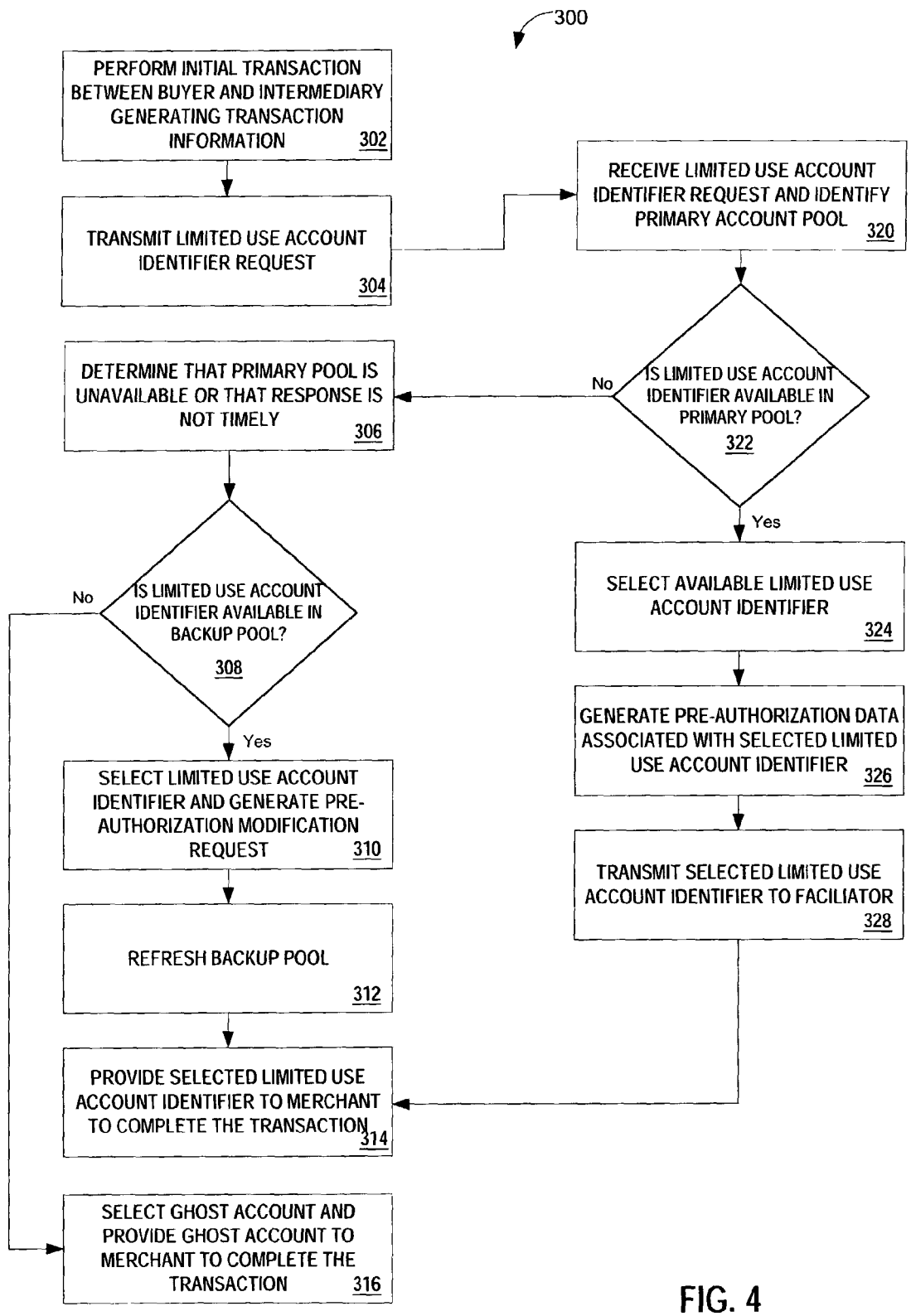
FIG. 4 is a flow diagram depicting a further process according to some embodiments.

Reference is now made to FIG. 4 where a further flow diagram is depicted which shows an overall process 300 which may be implemented between a transaction facilitator (e.g., such as a facilitator operating facilitator device 104 of FIG. 1) and an account issuer (e.g., such as the account issuer operating issuer device 110 of FIG. 1) to complete a transaction. In the process of FIG. 4, the processing performed on the left-hand side of the diagram (e.g., items 302-316) may be performed under the control of a transaction facilitator, while the processing performed on the right-hand side of the diagram (e.g., items 320-328) may be performed under the control of an entity such as an issuer or issuer processor (or other entity which is responsible for maintaining the primary card pool on behalf of the transaction facilitator). An illustrative example will be described in conjunction with a description of each of the process steps of FIG. 4 (i.e., an example in which a buyer purchases travel products using a travel Web site, including a rental car from Hertz and airline tickets from United Airlines).

Process 300 begins at 302 where a transaction facilitator performs an initial transaction involving a buyer in which the buyer selects and indicates a desire to purchase one or more products from one or more merchants. In the example transaction, processing at 302 may include the buyer visiting a Web-site operated by a travel agency and using the search tools provided on the Web-site to search for and select a desired rental car and airline ticket. For example, the buyer may select a Hertz rental car to be picked up at LAX on Mar. 15, 2003, returning the car on Mar. 17, 2003 for a total price of $150. The buyer may also select a round trip ticket on United Airlines flight 82 to LAX, arriving on March 15, returning on March 17 on flight 81 for a total price of $300.

Once the buyer indicates to the transaction facilitator that the travel arrangements are satisfactory and agrees to purchase the travel products, a transaction record associated with the transaction is created. In some embodiments, the buyer may be required to pay the transaction facilitator for the travel arrangements at this time (e.g., including payment for the flight, and the car as well as a transaction fee of $25 for a total payment of $475). The travel agency will then be responsible for paying the two merchants for the products. According to some embodiments, the merchants are paid using limited use account identifiers which are associated with the transaction.

Processing at 304 includes generating and transmitting a limited use account identifier request. For example, in some embodiments, this request may be generated using XML formatting and transmitted to a processor (such as an issuer processor) over the Internet. Other communications and message formats may also be used. In some embodiments, the message transmitted includes details of the proposed transaction. These transaction details are used to create one or more use limitations. In some embodiments, processing at 304 (and including processing at 320-328 or 306-314) is performed while the buyer is on-line with the transaction facilitator (e.g., during the course of a transaction session involving the buyer), so that limited use account identifiers are identified and associated with the transaction before the session with the buyer is completed. In the example, processing at 304 may include the travel agency generating an XML-formatted message which includes a request for two limited use account identifiers, a first having transaction details of: a start date of Mar. 15, 2003; a completion date of Mar. 17, 2003; a purchase price of $300; where the merchant is United Airlines.

Processing continues at 320 where the issuer (or other party responsible for maintaining the primary account pool for the transaction facilitator) receives the limited use account identifier request and identifies the primary account pool associated with the transaction facilitator. For example, the identification may be performed by comparing identifying information received from the transaction facilitator (e.g., which may be included in the message received at 320) with identifiers associated with each of the primary account pools maintained by the issuer.

Processing continues at 322 where a determination is made whether a limited use account identifier is available in the primary pool. For example, in some situations, all of the limited use account identifiers may be in use (i.e., none are available for association with the current request). In other embodiments, the determination that no limited use account identifiers are available from the primary pool may be based on timing considerations. For example, some transaction facilitators may establish rules that if the issuer (or other entity responsible for managing the primary account pool) is unable to respond with a pre-authorized limited use account identifier within a certain period of time that the transaction facilitator will treat the primary pool as unavailable. In either situation, processing at 322 may return a message to the transaction facilitator indicating that no limited use account identifiers are available, or the timeframe has been exceeded (in which case no message may be returned).

If processing at 322 indicates that a limited use account identifier is available, processing continues at 324 where the available limited use account identifier is selected and associated with the instant transaction. For example, this may include changing a status of the limited use account identifier to indicate that it is "in use" or otherwise unavailable to be associated with other transactions. In the illustrative example, processing at 322 may include determining if two limited use account identifiers are available in the primary pool. If they are, processing at 324 may include selecting the two limited use account identifiers and changing their status to "in use".

Processing continues at 326 where pre-authorization data is generated and associated with the selected limited use account identifier. For example, this may include parsing the transaction information received at 320 to generate a pre-authorization record that includes one or more restrictions tying the limited use account identifier to the present transaction. In the illustrative example, this may include generating two separate pre-authorization records: one for the transaction with Hertz; another for the transaction with United Airlines. Or, in some embodiments, the facilitator may send two separate transaction messages (one for United Airlines and one for Hertz) which would result in the generation of two pre-authorization records.

Each, or both, of the pre-authorization records may include use limitations including restrictions on the timing of the transaction (e.g., perhaps limiting the approval of the transaction to transaction dates between March 1 and Mar. 30, 2003), the price of the transaction (e.g., perhaps limiting the amount of the airline transaction to under $300 and the rental car transaction to under $150), the merchant associated with the transaction (e.g., perhaps limiting the merchants to United Airlines and Hertz, respectively, or limiting the merchant category codes associated with each transaction to an airline and rental car agency, respectively), etc. In some embodiments, the pre-authorization records may be established with thresholds, allowing for some variation in approvals. For example, the rental car pre-authorization record may be established with a margin of +/−$25 to allow for additional charges such as charges for gasoline, etc.

Processing at 326 may further include submitting the pre-authorization request or record to an issuer (e.g., if the card pool is maintained by an entity other than the issuer of the limited use accounts). The pre-authorization record is then associated with the issuer processor so that any authorization requests received associated with the limited use account can be compared to the pre-authorization record for approval or denial.

Processing continues at 328 where the selected limited use account identifier (or identifiers) are transmitted or otherwise communicated to the transaction facilitator. For example, any selected identifiers may be electronically or physically transmitted back to the facilitator for use in completing a transaction with the merchant or merchants.

Processing continues at 314 where the transaction facilitator provides the selected limited use account identifier to the merchant to complete the transaction. For example, in the illustrative example, one limited use account identifier will be provided to Hertz and another will be provided to United Airlines. Each of the merchants, in some embodiments, will further be provided with a confirmation number or other transaction information which includes details regarding the transaction terms with which the selected limited use account identifier may be utilized. The merchants may then present the limited use account identifier to the account issuer for payment. As described above, the merchant must present the limited use account identifier to the issuer in accordance with the use limitations which were established for the limited use account identifier (if the use limitations are not complied with, the transaction will be declined and the merchant will not receive payment).

Returning to processing at 322, if processing at 322 indicates that no limited use account identifiers are available for association with a particular transaction (e.g., all of the account identifiers in the primary pool are already allocated to transactions or the entity managing the pool is unable to respond within a pre-established amount of time), processing continues at 306 where the transaction facilitator determines that the primary pool is unavailable.

In some embodiments, processing in such a situation may progress to a determination at 308 where the transaction facilitator determines whether a limited use account identifier is available in a backup pool (which may be maintained, for example, by the transaction facilitator). In some embodiments, the backup pool may be a subset of the primary pool. For example, the backup pool may consist of a number of limited use account identifiers which are issued by the account issuer on behalf of the transaction facilitator. The identifiers which are placed in the backup pool may be an identified number or percentage of the total number of limited use account identifiers associated with the transaction facilitator. For example, if the transaction facilitator is issued a total of 500 limited use account identifiers, 50 of them may be placed in the backup pool. The limited use account identifiers which are placed in the backup pool may be tracked in the primary pool as being "in use".

In some embodiments, each of the limited use account identifiers placed in the backup pool are pre-authorized with specific use limitations to ensure that they are not misused. For example, in the illustrative example, the travel agency may maintain a backup pool consisting of 50 limited use account identifiers which are each preauthorized for transactions of no greater than $200 each, and with date limitations indicating that they must be used prior to the end of the current year. In this manner, any fraudulent use of the limited use account identifiers which are placed in the backup pool (which is possibly less secure or subject to fraud than the primary pool under the control of the account issuer) can be limited or controlled. In some embodiments, the backup pool may consist of limited use account identifiers with no preauthorized dollar limit, or with a pre-authorized dollar limit of $0 (in either embodiment, the amount will be modified when retrieved, as discussed below).

If a limited use account identifier is available for use in the backup pool, processing continues at 310 where the limited use account identifier is selected and associated with the transaction. A pre-authorization modification request is generated to update the use limitations to reflect the terms of the current transaction. For example, in the illustrative example, if two limited use account identifiers are retrieved from the backup pool of the travel agency, two pre-authorization modification requests will be generated to tie the use of the two account identifiers to the two contemplated transactions (one associated with a rental car transaction with Hertz, one associated with airline tickets from United Airlines). For example, the limited use account identifier associated with the Hertz transaction may have its use limitations amended to reflect a purchase amount of $150 and a transaction period of between March 1 and Mar. 30, 2003. Similar amendments to the use limitations may be associated with the transaction identifier to be associated with the United Airlines transaction.

The pre-authorization modification request may be submitted in real time (e.g., before the completion of the transaction with the buyer) or it may be submitted in a batch mode at a later time. The pre-authorization modification request is submitted to the issuer (or to an issuer processor responsible for authorization processing of transactions associated with account identifiers issued by the issuer). In general, the pre-authorization modification request should be submitted to modify the pre-authorization record prior to the time in which the merchant will submit the limited use account identifier for authorization.

Processing continues at 312 where the backup pool is refreshed. In some embodiments, the size of the backup pool will be maintained. For example, if two limited use account identifiers are retrieved from a backup pool which is designated as containing 50 account identifiers, the backup pool will be refreshed at 314 by adding two more limited use account identifiers. In some embodiments, these additional limited use account identifiers are retrieved from the primary pool associated with the transaction facilitator. In some embodiments, the limited use account identifiers are pulled from the primary pool by changing their status to "in use" and by generating a pre-authorization record for each to place them in a status for use in the backup pool. For example, in the illustrative example, each of the limited use account identifiers in the backup pool of the travel agency are pre-authorized in amounts of $200 and with validity periods extending to the end of the current calendar year. A pre-authorization request in such an example which is issued at 312 will establish these limitations for the account identifiers added to the backup pool. In this manner, a primary and a backup card pool can be maintained for each transaction facilitator to provide an alternative source of account identifiers. Further, because the backup limited use account identifiers are pre-authorized with designated use limitations, the transaction facilitator's exposure can be readily controlled and limited.

Those skilled in the art will recognize that other use limitations may be imposed on the accounts which are placed in the backup pool. Further, in some embodiments, multiple backup pools may be maintained, each having different limited use conditions. For example, the travel agency in the illustrative example may have two backup pools: one having account identifiers pre-authorized for amounts less than $100, the other having account identifiers pre-authorized for amounts less than $200. In another example, the travel agency may have three backup pools: one having account identifiers pre-authorized for use with rental car agencies; another having account identifiers pre-authorized for use with airlines; and a third having account identifiers pre-authorized for use with hotels. Those skilled in the art will recognize that other use limitations and configurations of primary and backup pools may be utilized to achieve desired objectives.

Processing continues at 314 where the selected limited use account identifier(s) are provided to the merchants to complete the transaction (as described above). In some embodiments, processing at 314 may include completing a transaction in which the buyer pays the transaction facilitator for the total amount of the products (plus any fees assessed by the facilitator). Processing at 314 may further include generating a confirmation message or record which is transmitted to the buyer and/or each of the merchants. This confirmation message or record may include details of the transaction which will allow the parties to resolve any dispute or questions concerning the transaction.

If processing at 322 and 306 indicate that the primary pool is not available and processing at 308 indicates that the backup pool is not available, processing, in some embodiments, continues at 316 where the transaction is completed using a backup payment account established for the purpose. For example, the account used at 316 may be a so-called "ghost account" which is, generally, a payment account which does not have a physical payment card associated with it. For example, the travel agency in the illustrative example may maintain one or more further backup financial accounts which may be used to authorize payment to merchants such as the rental car agency and the airline of the sources of limited use account identifiers are unavailable. In this manner, transactions may always be completed, even if communications with an account issuer are down and if all backup pools are exhausted. Preferably, the size of the backup card pools are such that processing at 316 is a limited occurrence.

Figure 5:
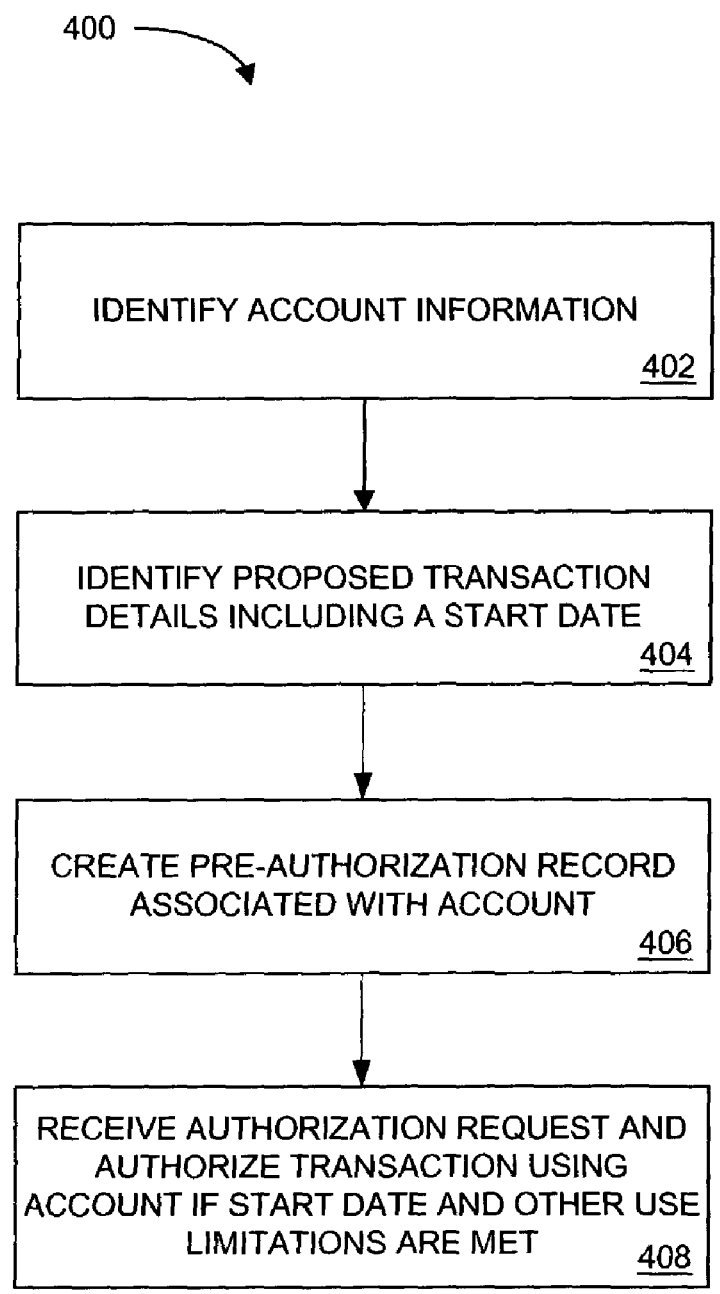
FIG. 5 is a flow diagram depicting a further process according to some embodiments.

Reference is now made to FIG. 5, where a further process 400 pursuant to some embodiments is depicted. As described above, pre-authorization records may be associated with individual limited use account identifiers to impose use restrictions on the account identifiers, thereby reducing the risk of fraud and other misuse of individual payment accounts. For example, as described above, use restrictions such as payment amounts, transaction dates, merchants, and other limitations may be associated with individual payment accounts. Pursuant to some embodiments, pre-authorization records may be created which include transaction start date limitations. Such embodiments may be utilized in conjunction with the limited use account identifiers described above. Further, such embodiments may be utilized in conjunction with other payment accounts which require authorization (e.g., such as payment card accounts such as credit or debit accounts).

As depicted, process 400 is performed by an issuer device (e.g., such as systems operated by or on behalf of a financial account issuer). Those skilled in the art will appreciate that some or all of the steps of process 400 may be performed by other devices or entities.

Process 400 begins at 402 where an account is identified. For example, processing at 402 may include receiving a request from an entity (such as, for example, a transaction facilitator, merchant, consumer, buyer, or other entity) requesting that use restrictions be associated with a payment account. Any of a number of different types of payment accounts may be identified at 402, such as, for example, a credit card account, a debit card account, a charge card account, direct deposit account, other financial payment accounts, or the like. In some embodiments, identification of an account may occur during any of the processes described above in conjunction with FIGS. 2-4. In other embodiments, identification of an account may occur in conjunction with other types of transactions (e.g., including consumer-initiated transactions, Internet transactions, mail-order or telephone-order transactions, etc.). In some embodiments, processing associated with process 400 may include modifications or deletions of limitations associated with limited use account identifiers.

Processing continues at 404 where information identifying terms of a proposed transaction involving the account identified at 402 are identified. For example, processing at 404 may be performed in conjunction with the identification of transaction terms as described above in conjunction with the processes of FIGS. 2-4 above. Processing at 404 may also be performed in conjunction with other types of transactions. For example, processing at 404 may include identifying a particular purchase transaction which is to be associated with the account identified in 402 and for which use limitations are to be imposed on the account. The types of transaction terms identified at 404 may include: a purchase price, a purchase start date, a purchase end date, a merchant, an industry code, etc. In some embodiments, a number of different start dates may also be established. For example, in some embodiments, recurring payments may be enforced using use limitations pursuant to embodiments of the present invention. As a specific illustrative example, a financial account may be associated with a pre-authorization record that allows the financial account to be charged on a regular basis for a specific term (e.g., to pay for recurring lease payments which need to be charged to the account on or before the $15^{th}$ of each month for 12 months). For such an embodiment, information provided at 404 may include information specifying the initial start date of the recurring payments, the date of each occurrence, the end date of the recurring payments, and the amount of each payment.

Processing continues at 406 where a pre-authorization record is created and associated with the account identified at 402. In particular, the pre-authorization is created with transaction-specific use limitations identified at 404. In some embodiments, the use limitations may first be compared with account limitations to ensure that the use limitations do not exceed other account limitations (e.g., to ensure that the payment amount in the pre-authorization record does not exceed the account credit limit, etc.). If the use limitations are consistent with the account limitations, a pre-authorization record is created which identifies the specific conditions which must be met for a transaction to be authorized. This pre-authorization record is associated with the account such that it is consulted when an authorization request is received for the account (e.g., at 408). For recurring transactions, multiple pre-authorization records may be established (e.g., one record may be established for each occurrence of the recurring transaction).

In particular, pursuant to embodiments associated with the process of FIG. 5, the pre-authorization record includes a use limitation specifying a start date. The start date is the earliest date for which a transaction involving the account will be authorized. For example, assume that the account identified at 402 is a credit card account, and that the transaction information identified at 404 indicate that the card is to be pre-authorized for a payment to Hertz for a rental car to be picked up on Mar. 15, 2003. The pre-authorization record created at 406 may include a start date term which indicates that any transaction using the card which is presented for authorization prior to Mar. 15, 2003 will be denied. That is, the card is restricted to use in transactions occurring on or after Mar. 15, 2003. Other use limitations may also be imposed (e.g., such as payment amounts, etc.) to further restrict use of the card.

Processing at 408 may occur some period of time after processing at 406 is completed. For example, a pre-authorization record may be established at a first period in time, and the account presented for authorization in a transaction at a second (later) period in time. The account may be presented for authorization in any of a number of ways. For example, if the account is a credit card account, the credit card account number may be keyed into a point of sale terminal by a merchant who desires to be paid using the account. The account information and related transaction details may be routed to the card issuer through the relevant payment card network. The card issuer may then compare the received transaction details with the pre-authorization record associated with the credit card account to determine if the received transaction details comport with the pre-authorization terms. If so, the transaction may be authorized and the merchant will receive payment pursuant to the credit card association rules. If the transaction details do not comply with the pre-authorization terms, the transaction will be declined and the merchant will not be paid (unless the merchant resubmits the authorization request with terms which do comply with the pre-authorization record). In particular, pursuant to embodiments as depicted in FIG. 5, processing at 408 includes comparing the date of the transaction to the start date identified in the pre-authorization record. If the transaction date is not equal to or later than the start date, the transaction will be declined.

Features of embodiments of the process of FIG. 5 may be incorporated into the limited use account identifier transaction system described above in conjunction with FIGS. 1-4 (e.g., limited use account identifiers distributed to transaction facilitators may include pre-authorization limitations defining permissible start dates). Features of embodiments of the process of FIG. 5 may further be utilized in conjunction with other payment accounts and transactions to limit the use of payment accounts to use after specified start dates.

Server

Referring now to FIG. 7, a block diagram of a representative issuer device 110 is illustrated. As previously discussed above, in some embodiments, the issuer device 110 may be or include a single device or computer, a networked set or group of devices or computers, a workstation, etc. Other devices of FIG. 1 may be configured in a similar manner as the server device depicted in FIG. 7.

In some embodiments, the issuer device 110 may include a processor, microchip, central processing unit, or computer 350 that is in communication with or otherwise uses or includes one or more communication ports 352 for communicating with buyer devices, facilitator devices 104, merchant devices, and/or other devices. Communication ports may include such things as local area network adapters, wireless communication devices, Bluetooth technology, etc. The issuer device 110 also may include an internal clock element 354 to maintain an accurate time and date for the issuer device 110, create time stamps for communications received or sent by the issuer device 110, etc.

If desired, the issuer device 110 may include one or more output devices 356 such as a printer, infrared or other transmitter, antenna, audio speaker, display screen or monitor, text to speech converter, etc., as well as one or more input devices 358 such as a bar code reader or other optical scanner, infrared or other receiver, antenna, magnetic stripe reader, image scanner, roller ball, touch pad, joystick, touch screen, microphone, computer keyboard, computer mouse, etc.

In addition to the above, the issuer device 110 may include a memory or data storage device 360 to store information, software, databases, communications, device drivers, etc. The memory or data storage device 360 preferably comprises an appropriate combination of magnetic, optical and/or semiconductor memory, and may include, for example, Random Read-Only Memory (ROM), Random Access Memory (RAM), a tape drive, flash memory, a floppy disk drive, a Zip™ disk drive, a compact disc and/or a hard disk. The issuer device 110 also may include separate ROM 362 and RAM 364.

The processor 350 and the data storage device 360 in the issuer device 110 each may be, for example: (i) located entirely within a single computer or other computing device; or (ii) connected to each other by a remote communication medium, such as a serial port cable, telephone line or radio frequency transceiver. In one embodiment, the issuer device 110 may comprise one or more computers that are connected to a remote server computer for maintaining databases.

A conventional personal computer or workstation with sufficient memory and processing capability may be used as the issuer device 110. In one embodiment, the issuer device 110 operates as or includes a Web server for an Internet environment. The issuer device 110 preferably is capable of high volume transaction processing, performing a significant number of mathematical calculations in processing communications and database searches. A Pentium™ microprocessor such as the Pentium III™ or IV™ microprocessor, manufactured by Intel Corporation may be used for the processor 350. Equivalent or other processors may be available from Motorola, Inc., AMD, or Sun Microsystems, Inc. The processor 350 also may comprise one or more microprocessors, computers, computer systems, etc.

Software may be resident and operating or operational on the issuer device 110. The software may be stored on the data storage device 360 and may include a control program 366 for operating the server, databases, etc. The control program 366 may control the processor 350. The processor 350 preferably performs instructions of the control program 366, and thereby operates in accordance with the present invention, and particularly in accordance with the methods described in detail herein. The control program 366 may be stored in a compressed, uncompiled and/or encrypted format. The control program 366 furthermore includes program elements that may be necessary, such as an operating system, a database management system and device drivers for allowing the processor 350 to interface with peripheral devices, databases, etc. Appropriate program elements are known to those skilled in the art, and need not be described in detail herein.

The issuer device 110 also may include or store information regarding different facilitators for which the issuer maintains card pools and establishes preauthorization records. The issuer device 110 may also include or store information identifying individual limited use account identifiers and their respective card pools. For example, information regarding one or more facilitators may be stored in a facilitator database 368 (e.g., such as unique identifying information such as cryptographic codes or keys allowing the issuer device to verifiably identify each facilitator and requests received from each facilitator). Information regarding one or more primary card pools maintained by the issuer device 104 may also be stored (e.g., in databases 370 through 372, storing a plurality of primary card pools A-N). In some embodiments, some or all of one or more of the databases may be stored or mirrored remotely from the issuer device 110. Other data may also be stored (e.g., such as pre-authorization record databases and information).

According to an embodiment of the present invention, the instructions of the control program may be read into a main memory from another computer-readable medium, such as from the ROM 362 to the RAM 364. Execution of sequences of the instructions in the control program causes the processor 350 to perform the process steps described herein. In alternative embodiments, hard-wired circuitry may be used in place of, or in combination with, software instructions for implementation of some or all of the methods of the present invention. Thus, embodiments of the present invention are not limited to any specific combination of hardware and software.

The processor 350, communication port 352, clock 354, output device 356, input device 358, data storage device 360, ROM 362, and RAM 364 may communicate or be connected directly or indirectly in a variety of ways. For example, the processor 350, communication port 352, clock 354, output device 356, input device 358, data storage device 360, ROM 362, and RAM 364 may be connected via a bus 376.

While a specific implementation and hardware/software configuration for the issuer device 110 has been illustrated, it should be noted that other implementations and hardware configurations are possible and that no specific implementation or hardware configuration is needed.

Facilitator Device

Figure 6:
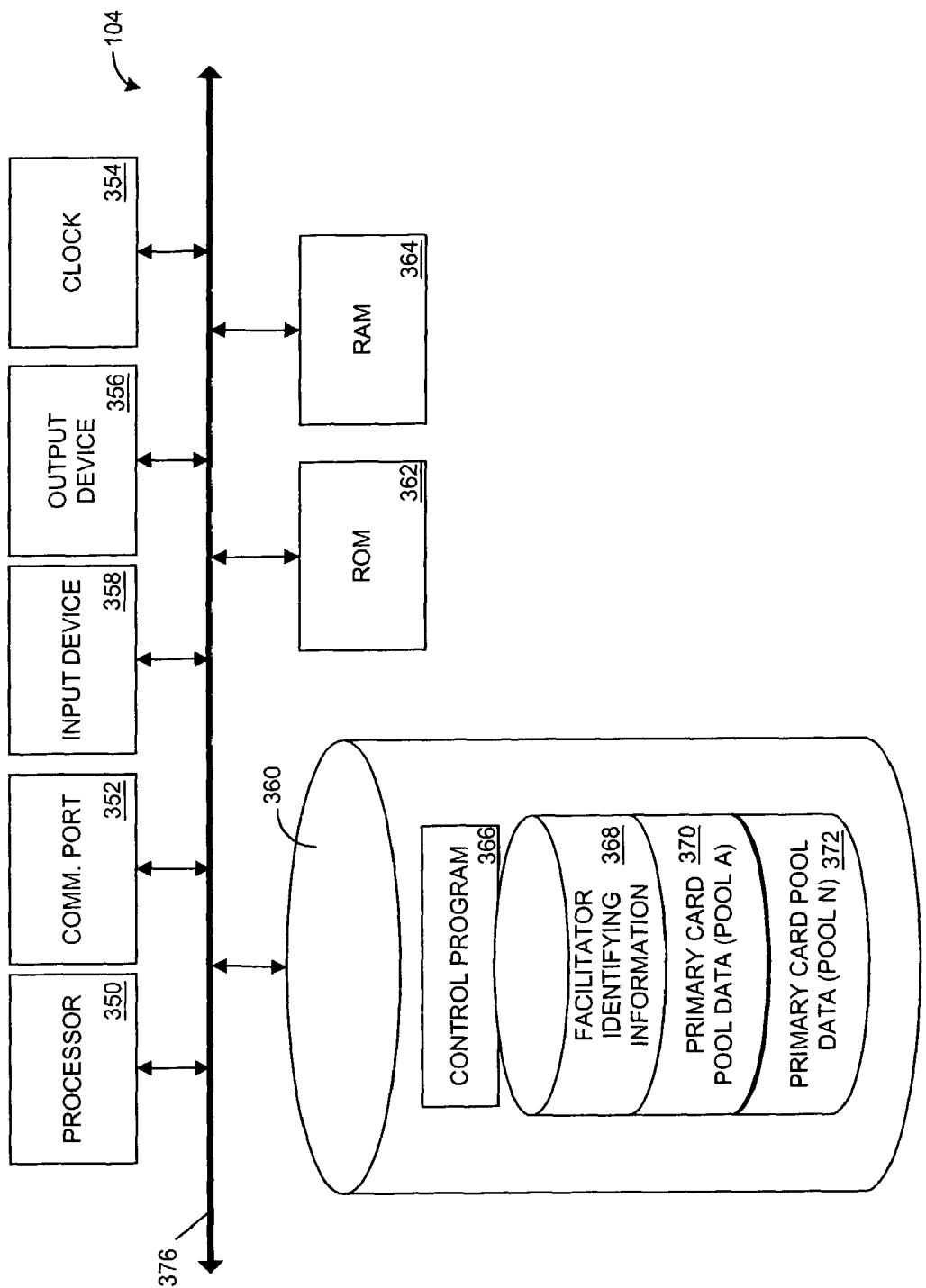
FIG. 6 is a block diagram depicting a device usable in the system of FIG. 1 according to some embodiments.

In some embodiments, the facilitator device 104 may have the same structure or configuration as the issuer device 110 illustrated in FIG. 6 and include some or all of the hardware and/or software components as the issuer device 110 illustrated in FIG. 6. In some embodiments, rather than storing a set of primary card pools, the facilitator device 104 stores (or is in communication with) one or more backup card pools. Further, the facilitator device 104 may also store (or be in communication) a database including buyer information as well as merchant information associated with transactions facilitated by the facilitator.

The methods of the present invention may be embodied as a computer program developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers. In addition, many, if not all, of the steps for the methods described above are optional or can be combined or performed in one or more alternative orders or sequences without departing from the scope of the present invention and the claims should not be construed as being limited to any particular order or sequence, unless specifically indicated.

Each of the methods described above can be performed on a single computer, computer system, microprocessor, etc. In addition, two or more of the steps in each of the methods described above could be performed on two or more different computers, computer systems, microprocessors, etc., some or all of which may be locally or remotely configured. The methods can be implemented in any sort or implementation of computer software, program, sets of instructions, code, ASIC, or specially designed chips, logic gates, or other hardware structured to directly effect or implement such software, programs, sets of instructions or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

Although the present invention has been described with respect to various embodiments thereof, those skilled in the art will note that various substitutions may be made to those embodiments described herein without departing from the spirit and scope of the present invention.

What is claimed is:

1. A transaction authorization method, comprising:
   receiving, by a payment processor computer for authorizing transactions and from a transaction facilitator, a request for a limited use identifier, wherein said request is based upon a transaction between a buyer and a merchant, wherein said transaction facilitator acts as an intermediary between said buyer and said merchant for said transaction;
   selecting, by said payment processor computer, a limited use account identifier from a pool of limited use account identifiers associated with said transaction facilitator
   associating, by said payment processor computer, said limited use account identifier with said transaction by creating a pre-authorization record associated with said limited use account identifier, said pre-authorization record including a use restriction based on transaction information which defines said transaction and includes a transaction amount and at least one of a merchant identifier, a merchant type, an industry code, a product identifier, a product type, a service identifier or an expiration date;
   providing, by said payment processor computer, said limited use account identifier to said transaction facilitator, wherein said transaction facilitator provides said limited use account identifier to said merchant; and
   in response to receiving, at said payment processor computer, an authorization request for said transaction, determining whether to approve said authorization request by comparing terms of said pre-authorization record with said authorization request.

2. The method of claim 1, wherein said authorization request is from said merchant and said authorization request contains said limited use account identifier.

3. The method of claim 1, wherein said authorization request is denied if said determining indicates said use restriction is not satisfied.

4. The method of claim 1, wherein said authorization request is approved if said determining indicates said use restriction is satisfied.

5. The method of claim 1, wherein said merchant involved in said transaction is compensated by at least one of an issuer or said transaction facilitator if said authorization request is approved.

6. The method of claim 1, wherein said transaction information further includes a start date, and wherein said associating said pre-authorization record further includes incorporating, into said pre-authorization record, said use restriction based on said start date.

7. A method for conducting a transaction, comprising:
   receiving, at a payment processor computer for conducting a transaction, from a transaction facilitator acting as an intermediary between a buyer and a plurality of merchants, transaction information based upon a plurality of transactions between said buyer and said plurality of merchants;
   identifying, by said payment processor computer, a request by said buyer to purchase a first item from a first merchant for a first price and a second item from a second merchant for a second price, wherein said first item and said second item comprise at least one of a product or a service;
   selecting, by said payment processor computer, a first limited use account identifier from a pool of limited use account identifiers associated with said transaction facilitator, said first limited use account identifier being associated with a pre-authorization record including a first use restriction associated with at least one of said first price, said first item, said first merchant, a merchant identifier, a merchant type, an industry code, a product identifier, a product type, a service identifier or an expiration date;

selecting, by said payment processor computer, a second limited use account identifier from said pool of limited use account identifiers associated with said transaction facilitator, said second limited use account identifier being associated with a pre-authorization record including a second use restriction associated with at least one of said second price, said second item, said second merchant, a merchant identifier, a merchant type, an industry code, a product identifier, a product type, a service identifier or an expiration date;

providing, by said payment processor computer to said transaction facilitator, said first limited use account identifier to facilitate payment for said first product or said first service from said first merchant and said second limited use account identifier to facilitate payment for said second product or said second service from said second merchant, wherein said first merchant is caused to be paid in response to said first limited use account identifier being properly presented for payment as part of an authorization request for said transaction, wherein said authorization request complies with terms of said pre-authorization record, and wherein said first use restriction is satisfied.

8. A transaction authorization apparatus, comprising:

a processor; and a storage device in communication with said processor and storing instructions adapted to be executed by said processor to:

receive, from a transaction facilitator, a request for a limited use identifier, wherein said request is based upon a transaction between a buyer and a merchant, wherein said transaction facilitator acts as an intermediary between said buyer and said merchant for said transaction;

select a limited use account identifier from a pool of limited use account identifiers associated with said transaction facilitator;

associate a pre-authorization record with said limited use account identifier, said pre-authorization record including a use restriction based on transaction information which defines said transaction and includes a transaction amount and at least one of a merchant identifier, a merchant type, an industry code, a product identifier, a product type, a service identifier or an expiration date;

associate said limited use account identifier with said transaction;

provide said limited use account identifier to said transaction facilitator, wherein said transaction facilitator provides said limited use account identifier to said merchant;

subsequently receive an authorization request for said transaction; and determine whether to approve said authorization request by comparing terms of said pre-authorization record with said authorization request.

9. A non-transitory tangible computer-readable medium having computer-executable instructions stored thereon that, if executed by a payment processor computer for authorizing a transaction, cause said payment processor computer to perform a method comprising:

receiving, by said payment processor computer and from a transaction facilitator, a request for a limited use identifier, wherein said request is based upon a transaction between a buyer and a merchant, wherein said transaction facilitator acts as an intermediary between said buyer and said merchant for said transaction;

selecting, by said payment processor computer, a limited use account identifier from a pool of limited use account identifiers associated with said transaction facilitator associating, by said payment processor computer, said limited use account identifier with said transaction by creating a pre-authorization record associated with said limited use account identifier, said pre-authorization record including a use restriction based on transaction information which defines said transaction and includes a transaction amount and at least one of a merchant identifier, a merchant type, an industry code, a product identifier, a product type, a service identifier or an expiration date;

providing, by said payment processor computer, said limited use account identifier to said transaction facilitator, wherein said transaction facilitator provides said limited use account identifier to said merchant; and in response to receiving, at said payment processor computer, an authorization request for said transaction, determining whether to approve said authorization request by comparing terms of said pre-authorization record with said authorization request.

10. A transaction method comprising:

receiving, by a payment processor computer for managing limited use identifiers and from a transaction facilitator, a request for a limited use identifier, wherein said request is based upon a transaction between a buyer and a merchant, wherein said transaction facilitator acts as an intermediary between said buyer and said merchant for said transaction;

requesting, by said payment processor computer, said limited use account identifier from a primary pool of limited use account identifiers associated with a transaction facilitator; and, receiving, at said payment processor computer, said limited use account identifier, wherein said limited use account identifier is associated with said transaction and pre-authorization information, wherein said pre-authorization information further comprises a pre-authorization record which is established based on said transaction information and said pre-authorization record includes a use restriction based on a transaction amount and at least one of a merchant identifier, a merchant type, an industry code, a product identifier, a product type, a service identifier or an expiration date, wherein said limited use account identifier is provided to said merchant.

11. The method of claim 10, wherein said request for a limited use account identifier is fulfilled within a predetermined time period.

12. The method of claim 10, further comprising selecting said limited use account identifier from a backup pool associated with said transaction facilitator in response to said request for said limited use account identifier not being fulfilled within a predetermined time period.

13. The method of claim 10, further comprising selecting said limited use account identifier from a backup pool associated with said transaction facilitator in response to said limited use account identifier not being available from said primary pool.

14. The method of claim 10, wherein said limited use account identifier is not available from said primary pool as a result of all of said limited use account identifiers being in use for other transactions.

15. The method of claim 10, further comprising requesting a refresh of a backup pool.

16. The method of claim 10, further comprising requesting a refresh of a backup pool, wherein said backup pool is refreshed by:
   retrieving a replacement limited use account identifier from said primary pool of limited use account identifiers;
   indicating that said replacement limited use account identifier is not available for use in said primary pool of limited use account identifiers;
   establishing pre-authorization criteria associated with said replacement limited use account identifier; and,
   providing said replacement limited use account identifier to be added to said backup pool.

17. The method of claim 10, further comprising selecting a ghost account and providing said ghost account to said merchant in response to said limited use account identifier not being available from said primary pool and said limited use account identifier not being available from a backup pool.

18. The method of claim 10, further comprising requesting a modification of said pre-authorization record.

19. The method of claim 10, further comprising requesting a modification of said pre-authorization record to change said use restriction.

20. The method of claim 10, further comprising selecting said limited use account identifier from a backup pool associated with said transaction facilitator, and requesting a modification of said pre-authorization record.

21. The method of claim 10, further comprising selecting said limited use account identifier from a backup pool associated with said transaction facilitator, and requesting a modification of said pre-authorization record to change said use restriction.

22. The method of claim 10, wherein said limited use account identifier is associated with said transaction in response to said request.

23. The method of claim 10, further comprising a backup pool which is accessible by at least one of an issuer and said transaction facilitator.

24. The method of claim 10, further comprising a backup pool, wherein said limited use account identifier is designated for said backup pool by an issuer and accessible by said transaction facilitator.

25. A transaction method comprising:
   receiving, by a payment processor computer for managing limited use identifiers and from a transaction facilitator, a request for a first limited use identifier and a second limited use identifier, wherein said request is based upon a buyer request associated with said buyer and a plurality of merchants, wherein said transaction facilitator acts as an intermediary between said buyer and said plurality of merchants for said transaction;

requesting, by said payment processor computer, a first limited use account identifier from a pool of limited use account identifiers associated with a transaction facilitator, wherein said first request includes first transaction information which identifies a first merchant and a first item product or first service at a first price associated with a first transaction;

requesting, by said payment processor computer, a second limited use account identifier from said pool of limited use account identifiers associated with said transaction facilitator;

receiving, at said payment processor computer, first pre-authorization information identifying said first limited use account identifier, wherein said first limited use account identifier is associated with said first transaction, said first pre-authorization information further comprising a first pre-authorization record which is established based on said first transaction information, said first pre-authorization record including a use restriction associated with at least one of said first price, said first product, said first service, said first merchant, a merchant identifier, a merchant type, an industry code, a product identifier, a product type, a service identifier or an expiration date, wherein said first pre-authorization information identifying said first limited use account identifier is provided to said first merchant; and, receiving, at said payment processor computer, second pre-authorization information identifying said second limited use account identifier, wherein said second limited use account identifier is associated with said second transaction, said second pre-authorization information further comprising a second pre-authorization record which is established based on said second transaction information, said second pre-authorization record including a use restriction associated with at least one of said second price, said second product, said second service, said second merchant, a merchant identifier, a merchant type, an industry code, a product identifier, a product type, a service identifier or an expiration date, wherein said second pre-authorization information identifying said second limited use account identifier is provided to said second merchant.

* * * * *